United States Patent [19]
Monroe

[11] Patent Number: 5,079,437
[45] Date of Patent: Jan. 7, 1992

[54] MULTI-VOLTAGE POWER SUPPLY

[75] Inventor: John W. Monroe, Warren, Mich.

[73] Assignee: The United States of America as represented by the Secretary of the Army, Washington, D.C.

[21] Appl. No.: 496,473

[22] Filed: Mar. 20, 1990

[51] Int. Cl.⁵ ............................................... H02J 1/00
[52] U.S. Cl. ......................................... 307/38; 307/9.1
[58] Field of Search ...................... 307/31, 33, 38, 9.1, 307/10.1

[56] References Cited

U.S. PATENT DOCUMENTS

| | | | |
|---|---|---|---|
| 4,471,232 | 9/1984 | Peddie et al. | 307/35 |
| 4,584,487 | 4/1985 | Hesse et al. | 307/38 |
| 4,617,472 | 10/1986 | Slavik | 307/38 |
| 4,639,609 | 1/1987 | Floyd et al. | 307/38 |

Primary Examiner—A. D. Pellinen
Assistant Examiner—Jeffrey A. Gaffin
Attorney, Agent, or Firm—Peter A. Taucher; David L. Kuhn

[57] ABSTRACT

A power supply unit including batteries to energize a plurality of circuits which have differing voltage requirements and fluctuating power demands. The power supply unit includes a battery monitoring circuit and a timer circuit. The timer circuit controls the intermittent interruption of current from the batteries to the utility circuits and the battery monitoring circuit tests the battery during the interruptions.

8 Claims, 3 Drawing Sheets

MULTI-VOLTAGE POWER SUPPLY

GOVERNMENT INTEREST

The invention herein described may be manufactured, used and licensed by or for the U.S. Government for governmental purposes without payment to me of any royalty thereon.

BACKGROUND OF THE INVENTION

In modern military vehicles, it is often desirable to have several electrical circuits within the vehicle, each circuit having a different operating voltage. One approach to servicing such a group of circuits is to have a plurality of batteries in series and to have each electrical circuit draw power only from some of these batteries so as to receive the desired voltage for that circuit. One problem with this approach is that batteries servicing both higher and lower voltage circuits are more heavily drained and fail sooner than the other batteries.

In many electrical utility circuits for military or other vehicles, there are a number of electrical components that are energized or de-energized independently of one another. Therefore the number of components drawing power from the battery and the total power demanded by the circuit will vary. A common example of such a circuit would be a light circuit having turn signal lights, head lights, brake lights and back up lights. To prolong life of the electrical components and to prevent power fluctuations from affecting such components as gauges, it is desirable for a power supply to maintain a steady voltage level to any given energized component. The steady voltage level must be maintained no matter what other components in the circuit are energized or de-energized.

SUMMARY OF THE INVENTION

My invention is a power supply unit which utilizes all of the batteries to power each circuit, so that no battery fails prematurely. In my power supply unit, a single voltage is output by a battery set comprised of a single battery or a group of batteries in series. The single voltage is processed by pulse width modulators in parallel with one another and in series with the battery set. The pulse width modulators are in series between the battery set and utility circuits powered by the battery set. The pulse width modulators permit utility circuits of different voltages to be powered by the battery set simultaneously. In addition, the particular voltage to any given utility circuit is maintained at a constant level by a filter downstream of, and in series with, each pulse width modulator. A constant voltage level is maintained even though the total current to the utility circuit and the total resistive load of the utility circuit vary. Because of this, the voltage and power supplied to any electrically energized component in a given utility circuit will always be the same.

In addition to the above features, my proposed power supply unit includes a timer circuit which synchronizes the pulse width modulators. This synchronization creates regularly occurring intervals during which none of the utility circuits is drawing current from the battery. The timing circuit activates a battery monitoring circuit during one of these intervals, and the monitoring circuit determines the internal resistance of the battery during the interval. The monitoring circuit compares the determined internal resistance to a preselected value to ascertain whether the battery set is failing.

DETAILED DESCRIPTION

Figure 1:
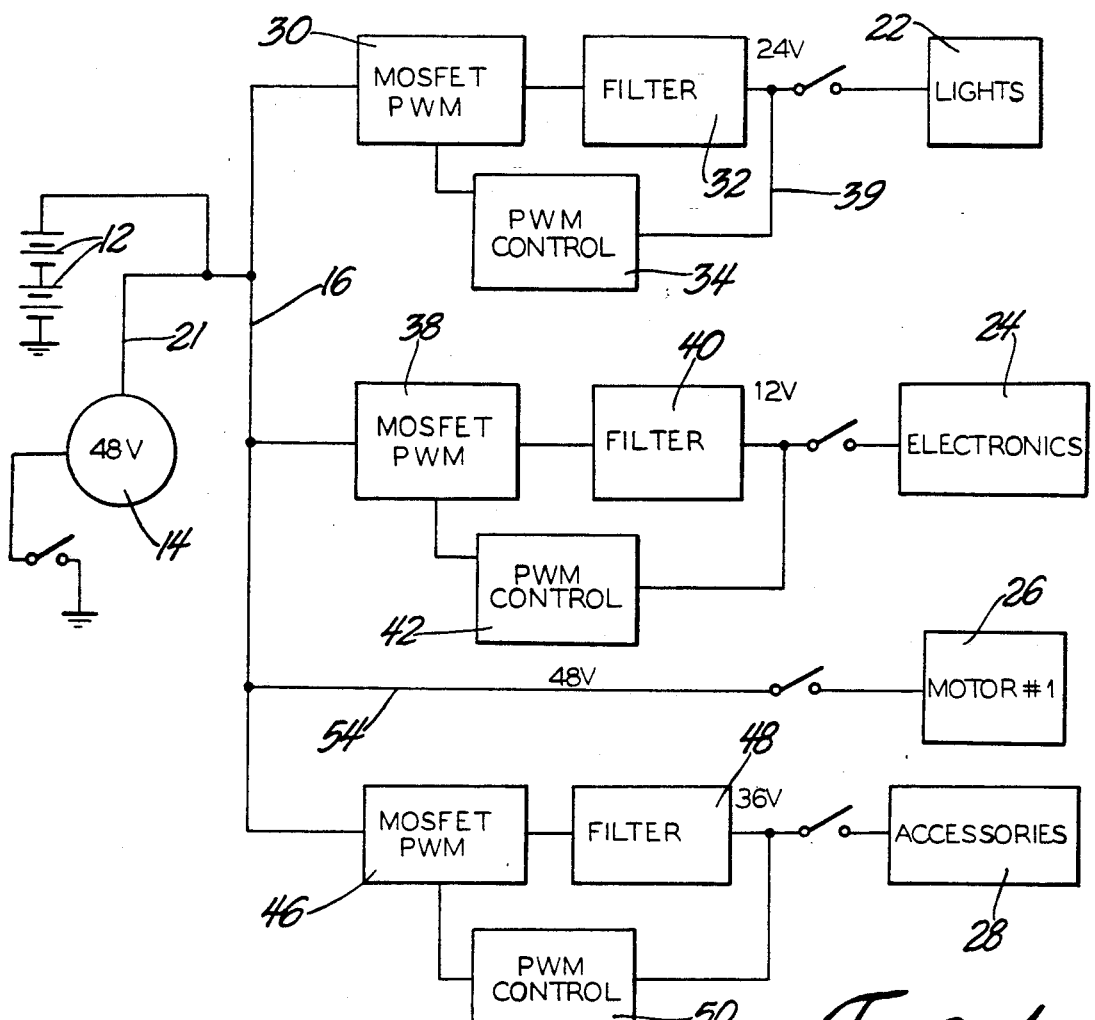
FIG. 1 is a power supply unit having pulse width modulators to vary the voltage supplied to various utility circuits powered by a battery set.

A power and voltage control circuit for my power supply unit is shown in FIG. 1 wherein two batteries 12 create a 48 volt electrical output. The voltage value for the power supply need not be 48 volts but can be any convenient value suitable for a given application. Batteries 12 are charged by generator 14 typically driven by a vehicle engine when the multi-voltage power supply is installed in an automotive military vehicle. Generator 14 includes a voltage regulator and includes a diode to prevent current sent out through line 21 from returning to the generator. Both batteries 12 and generator 14 are capable of sending electrical power to bus line 16.

Line 16 ultimately connects to a variety of utility circuits. These circuits can include, for example, light circuit 22, electronics circuit 24, electric motor circuit 26 and accessories circuit 28, each of these circuits requiring a different voltage level for operation. Typically the light circuit includes head lamps and tail lights, the electronics circuit includes sensors and computers, the electric motor circuit powers motors for traversing turrets in armored vehicles or operating pumps, and the accessories circuit can include video monitors and range finding equipment.

Connected between circuit 22 and line 16 is a set of elements whose purpose is to lower the voltage of current flowing from line 16 to circuit 22. This set of elements includes a MOSFET pulse width modulator 30, a filter 32 and a pulse width modulator control component 34. These components are respectively labelled MOSFET PWM, Filter, and PWM control in the figures, the acronym MOSFET referring to a metal-oxide-silicon field effect transistor. Once per given time period $T_1$, control component 34 sends a governing signal to modulator 30 and modulator 30 responds by interrupting flow of current from line 16 for the duration of this signal. The foregoing discussion assumes that pulse width modulator 30 is an enhancement type MOSFET, but a depletion type MOSFET could be used for modulator 30.

Figure 4:
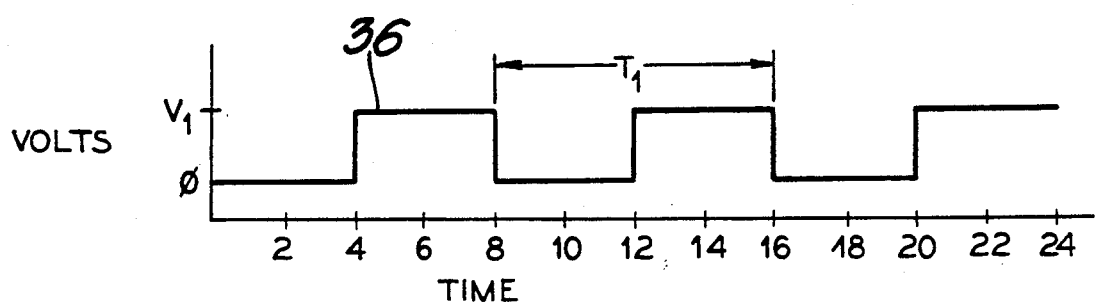
FIGS. 4, 5 and 6 show the output from various pulse width modulators in the power supply circuit.

The governing signals are of uniform length and last for a controlled, predetermined portion of the period. The uniform length of the signals and the predetermined portion of the period can be modified by feedback received by component 34 from filter 32. In the case of modulator 30, the unmodified governing signal lasts for one half of the period. The resulting voltage output from modulator 30 is shown in FIG. 4 as square wave output signal 36 having an average voltage halfway between zero and the $V_1$ value of 48 volts.

Filter 32 receives square wave output signal 36 from pulse width modulator 30 and converts it to an essentially constant voltage signal whose ripple, or variation in voltage, is insignificant compared to the average voltage. The ripple is preferably less than one per cent of the average voltage to circuit 22, which will be 24 volts. A feedback line 39 is connected at the output side of filter 32 and leads to control component 34, so that component 34 receives a feedback signal having the same voltage as the output from filter 32. If the feedback voltage is less than 24 volts, then control component 34 will shorten the length of the governing signal to pulse width modulator 30 and thereby increase the voltage from filter 32. Conversely, if the feedback voltage is more than 24 volts, control component 34 will increase the length of the governing signal and thereby reduce the output voltage of filter 32.

Figure 5:
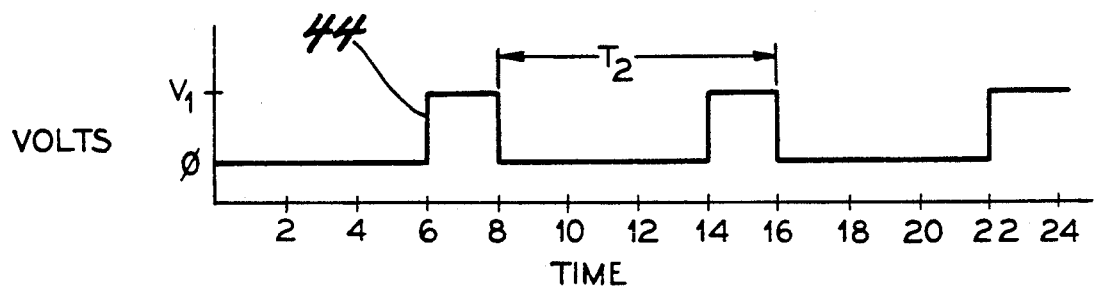

Connected between circuit 24 and line 16 is second set of voltage control elements similar in function to the components connected between line 16 and circuit 22. This second set of elements includes a MOSFET pulse width modulator 38, a filter 40 and a pulse width modulator control component 42. In the case of modulator 38, the unmodified governing signal lasts for one fourth of the period $T_2$. The resulting voltage output from modulator 38 is shown in FIG. 5 as square wave output signal 44 having an average voltage one fourth of the way from 0 to the $V_1$ value of 48 volts, so that circuit 24 receives a constant voltage of 12 volts. The governing signals can be modified by feedback received at component 42 from filter 40 should the voltage output from modulator 38 vary from 12 volts. The feedback from filter 40 will occur in the same fashion as the feedback from filter 32 discussed above.

Figure 6:
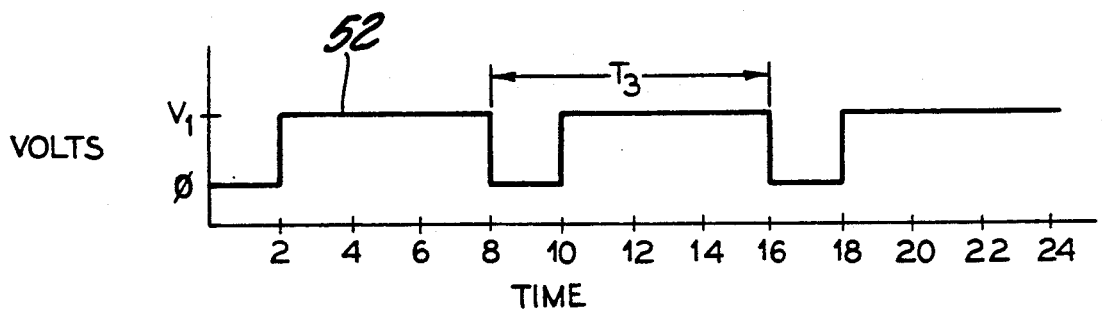

Connected between circuit 28 and line 16 is another, third set of voltage control elements similar in function to the elements connected between line 16 and circuit 22. This third set of elements also includes a MOSFET pulse width modulator 46, a filter 48 and a pulse width modulator control component 50. In the case of modulator 46, the unmodified governing signal lasts for three fourths of the period $T_3$. The resulting voltage output from modulator 46 is shown in FIG. 6 as square wave output signal 52 having an average voltage three fourths of the way from 0 to $V_1$, so that circuit 24 receives a constant voltage of 36 volts. The governing signals can be modified by feedback received by component 50 from filter 48 so that the third set of voltage control elements seeks a constant voltage of 36 volts.

Circuit 26 can receive power directly from line 16 through line 54, since its voltage requirement is the same as the voltage output from batteries 12 or generator 14. Optionally, in some applications, it may be desirable to place a filter such as those found at 32, 40 or 48 in line 54 in order to achieve a constant voltage for circuit 26.

Figure 2:
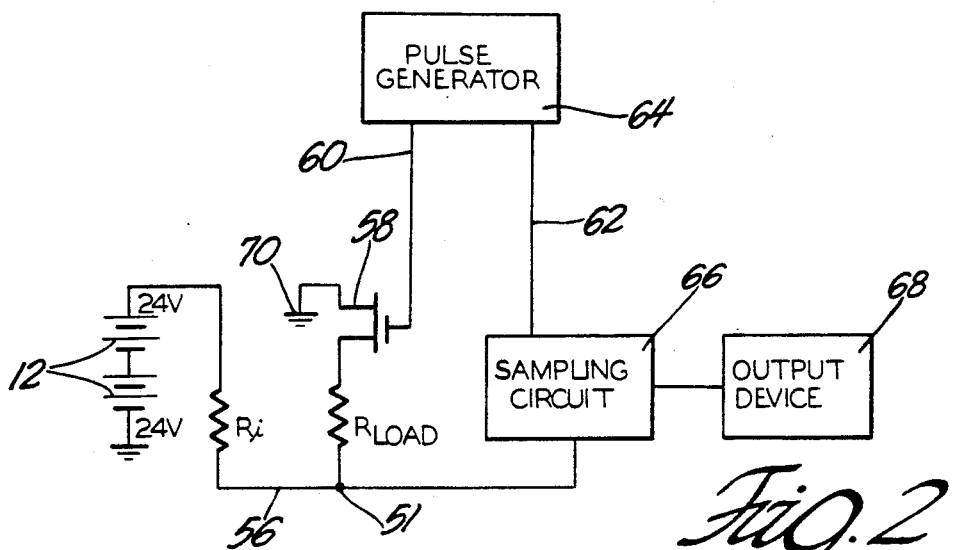
FIG. 2 is a battery monitoring circuit.

My power supply unit has a battery monitoring circuit which is shown in FIG. 2. The battery monitoring circuit is connected to the output of in-series batteries 12 which have an internal resistance $R_1$. The internal resistance has been found to be a reliable indicator of the condition of the batteries, a relatively high internal resistance indicating that the batteries are failing or malfunctioning. Batteries 12 are connected through line 56 to a precisely measured resistance $R_{load}$ connected in series with grounded transistor 58. In series with batteries 12 and in parallel with $R_{load}$ is a sampling circuit 66 which measures the voltage at a point 51 between batteries 12 and $R_{load}$. By using the rated voltage of the battery (in this case 48 volts) the measured voltage value and the known resistance $R_{load}$, sampling circuit 66 calculates the value for $R_1$. Circuit 66 compares the calculated $R_1$ value to a preselected maximum allowable value and sends a signal to output device 68 if $R_1$ exceeds the maximum allowable value. In the alternative, circuit 66 can be additionally programmed to output a signal to device 68 representing the value of $R_1$ and send 68 will then also give a visual read out of the value.

The battery monitoring circuit includes a signal pulse generator 64 for sending a pulse to transistor 58. The pulse received by transistor 58 enables it momentarily pass current so that the connection between $R_{load}$ and ground 70 is closed. At the same time that transistor 58 receives a pulse, sampling circuit 66 also receives a pulse. At the moment when sampling circuit 66 receives a pulse, it instantaneously measures the voltage at point 51. Pulse generator 64 can be set to generate pulses at relatively short intervals of, say, several seconds or at relatively long intervals of 10 minutes or longer. The duration of the pulses from generator 64 is relatively short, on the order of microseconds, so that the amount of power used to monitor batteries 12 is negligible in relation to the power that the batteries supply to loads such as lights or motors.

Figure 3:
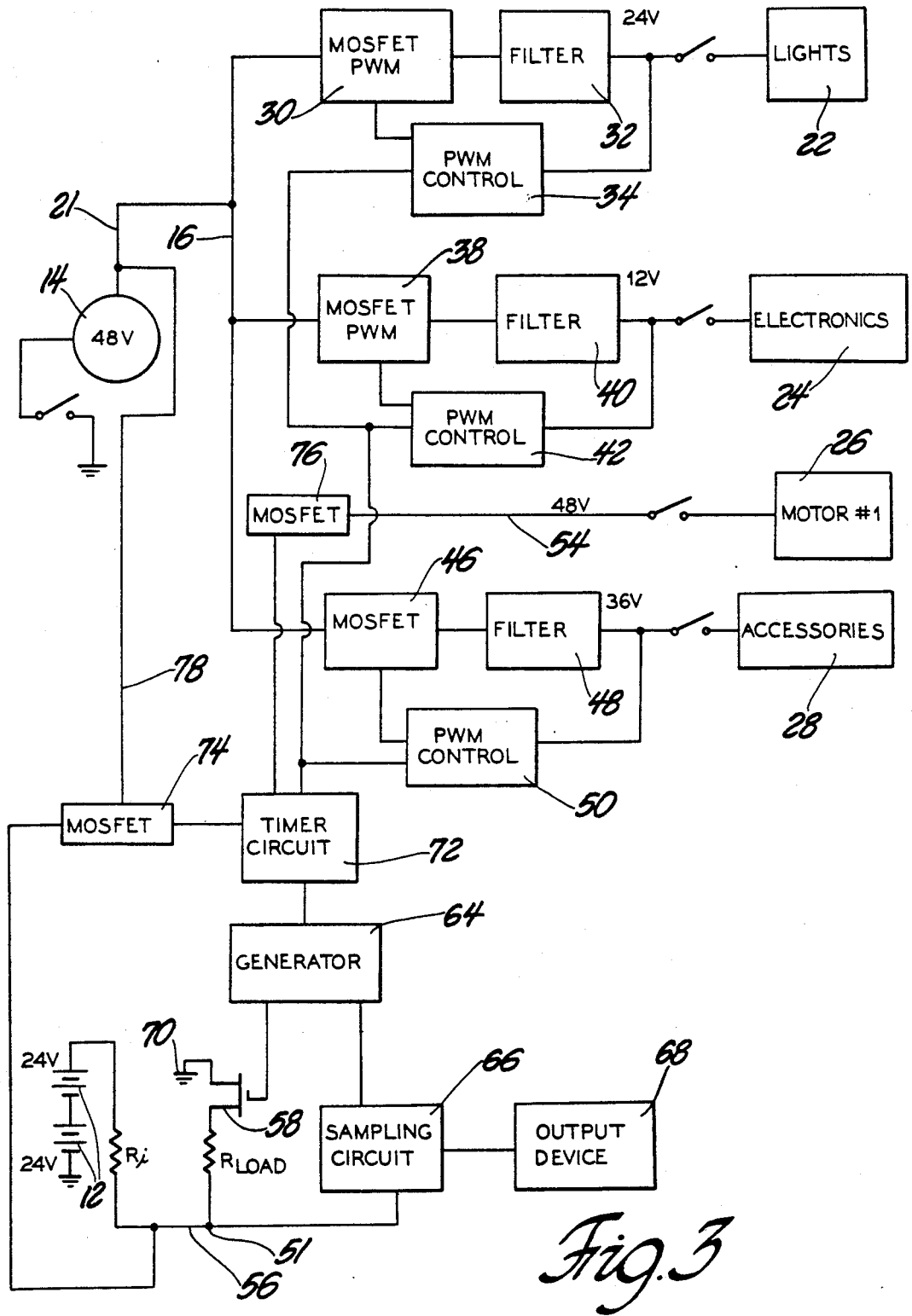
FIG. 3 is a power supply circuit with pulse width modulators and a battery monitoring circuit.

FIG. 3 is a complete multi-voltage power supply circuit combining circuitry from FIGS. 1 and 2 and includes components to coordinate the action of this circuitry. Components in FIG. 3 that are the same as those found in either FIG. 1 or FIG. 2 are given the same element numbers as the respective components in FIG. 3. The added components in the FIG. 3 circuit include timer circuit 72, MOSFET 74 and MOSFET 76. As mentioned earlier, the acronym MOSFET stands for metal-oxide-silicon field effect transistor.

Timer circuit 72 is connected to, and sends period initializing signals to, each of the pulse width modulator control components 34, 42 and 50. The initializing signals insure that the governing signals sent from each control component to the pulse width modulators all begin at the same time. The initializing signals are given at regular intervals so that periods $T_1$, $T_2$, and $T_3$ are equal to some predetermined time span. During the periods, there will be an initial interval during which all of the governing signals are ongoing, so that no current passes from batteries 12 through modulators 30, 38 and 46. Consequently, during these intervals, neither these modulators nor electrical components downstream of them will cause a load on the batteries.

Simultaneously with the sending of the initializing signals, timer circuit 72 also sends interruption signals to MOSFETs 74 and 76. The interrupter signals will occur during the initial interval and preferably last from the beginning to the end of the initial intervals. When MOSFET 76 receives an initializing signal, MOSFET 76 stops the flow of current into line 54 from line 16 so that circuit 26 gets no current at the same time that circuits 22, 24 and 28 are receiving no current. Thus during the initial interval, batteries 12 are free of load from all the utility circuits. When MOSFET 74 receives an interrupter signal, it stops the flow of current in line 78 from generator 14 to batteries 12 so that batteries 12 can not be charged by the generator during the initial interval.

It can be seen that the initial interval is a time when the battery is isolated from its normal loads and from charging by generator 14 and it is therefore possible to perform an electrical test on the batteries during this interval. For this purpose, timer circuit 72 sends a coordinating signal to pulse generator 64 in the battery monitoring circuit at some point during the initial interval. Pulse generator in turn signals transistor 58 and sampling circuit 66. Then, in the manner previously described, current momentarily flows through R$_{load}$ to ground, sampling circuit 66 measures the voltage at point 51, and the sampling circuit determines the internal resistance of batteries 12.

I wish it to be understood that I do not desire to be limited to the exact details of construction and operation disclosed herein since obvious modifications will occur to those skilled in the relevant arts without departing from the spirit and scope of the following claims.

I claim

1. A power supply unit for maintaining a steady but different voltage to each of a plurality of utility circuits having a variable electrical load, the power supply circuit comprising:
   a set of two or more batteries in series with one another, the set of batteries supplying current at a selected voltage;
   a plurality of relatively lower voltage utility circuits operating at less than the selected voltage, the lower voltage utility circuits being in parallel with one another and in series with the set of batteries;
   a plurality of pulse width modulators, a different one of the pulse width modulators connected in series between the set of batteries and each of the lower voltage utility circuits, wherein the pulse width modulators operate during a series of periods, each pulse width modulator shutting off current from the batteries to an associated utility circuit for a portion of each period, and wherein at least one pulse width modulator shuts off current for a differently sized portion of the period than another pulse width modulator;
   a filter in series between each of the pulse width modulators and the associated utility circuit.

2. The power supply unit of claim 1 further including:
   a timer circuit to synchronize the pulse width modulators so that the periods of the pulse width modulators all begin and end together and so that there is an interval in each period when no current flows from the batteries to any of the lower voltage utility circuits;
   a battery monitoring circuit connected in series with the set of batteries and determining the internal resistance of the batteries during the intervals.

3. The power supply unit of claim 2 wherein the battery monitoring circuit further includes:
   a ground;
   a resistor of known, fixed value in series between the batteries and the ground;
   a normally nonconducting means for interrupting current, the normally nonconducting means being connected in series with the resistor between the batteries and the ground;
   a pulse generator sending periodic electrical pulses in response to coordinating signals from the timer circuit, the electrical pulses causing the normally nonconducting means to conduct current during the intervals;
   means for measuring the voltage between the batteries and the ground when the normally nonconducting means conducts current.

4. The power supply unit of claim 3 wherein the pulse generator sends additional pulses simultaneously with the periodic pulses, the additional pulses activating the measuring means during the interval.

5. The power supply unit of claim 4 further including:
   a relatively higher voltage utility circuit connected in series with the set of batteries, the higher voltage utility circuit operating at an equal voltage to voltage output by the set of batteries;
   a normally conducting means for intermittently interrupting current flow, the normally conducting means being in series between the set of batteries and the higher voltage utility circuit, the normally conducting means responding to interruption signals from the timer circuit by shutting off current from the batteries to the higher voltage utility circuit during the interruption signals.

6. The power supply unit of claim 5 further including:
   a generator in series with the pulse width modulators, the higher voltage circuit and the set of batteries;
   a stoppage means for intermittently interrupting current flow between the generator and the batteries, whereby the generator does not charge the batteries, the stoppage means responding to control signals from the timer circuit by shutting current from the generator to the batteries during the control signals.

7. The power supply unit of claim 6 wherein:
   at least one of the pulse width modulators has a control component connected thereto;
   the control component senses the voltage at a point in series between the filter associated with the one pulse width modulator and the relatively lower voltage utility circuit associated with the one pulse width modulator;
   the control component compares the sensed voltage to a standard voltage;
   the control component varies the portion of the period that the one pulse width modulator shuts off current to the filter associated therewith in response to a difference between the sensed voltage and the standard voltage.

8. An electrical system of a vehicle, comprising:
   a plurality of utility circuits each having a set of electrical components wherein at least some components of the set can be energized or de-energized independently of one another, the components of each set operating at a voltage common to the set, at least two of the sets having voltages differing from one another;
   a battery in series with the utility circuits, the battery having an output voltage greater than the common voltages;
   a different pulse width modulator connected in series between the battery and each utility circuit, wherein the pulse width modulators operate during a series of periods, each pulse width modulator shutting off current from the batteries to an associated one of the utility circuits for a portion of each period;
   a filter in series between each pulse width modulator and each associated utility circuit;
   wherein at least one of the pulse width modulators has a control component connected thereto, the control component sensing the voltage at a point in series between the filter associated with the one pulse width modulator and the utility circuit associated with the one pulse width modulator, the control component comparing the sensed voltage to a standard voltage, and the control component varying the portion of the period that the one pulse width modulator shuts off current to the filter associated therewith in response to a difference between the sensed voltage and the selected standard voltage.

* * * * *